United States Patent
Nakagawa et al.

(10) Patent No.: US 11,746,682 B2
(45) Date of Patent: Sep. 5, 2023

(54) METHOD FOR MANUFACTURING A VEHICLE MUFFLER

(71) Applicant: NAKAGAWA SANGYO Co., Ltd., Inuyama (JP)

(72) Inventors: Hiroshige Nakagawa, Inuyama (JP); Noriaki Nakagawa, Inuyama (JP)

(73) Assignee: NAKAGAWA SANGYO CO., LTD., Inuyama (JP)

( * ) Notice: Subject to any disclaimer, the term of this patent is extended or adjusted under 35 U.S.C. 154(b) by 0 days.

(21) Appl. No.: 17/653,503

(22) Filed: Mar. 4, 2022

(65) Prior Publication Data
US 2022/0282649 A1    Sep. 8, 2022

(30) Foreign Application Priority Data
Mar. 8, 2021    (JP) .................. 2021-035930

(51) Int. Cl.
*D04H 1/74*    (2006.01)
*F01N 1/24*    (2006.01)
(Continued)

(52) U.S. Cl.
CPC ............... *F01N 1/24* (2013.01); *B29D 23/00* (2013.01); *D04H 1/74* (2013.01); *D04H 13/00* (2013.01);
(Continued)

(58) Field of Classification Search
CPC .. F01N 3/0226; F01N 13/18; F01N 2330/101; F01N 2330/102; F01N 2450/02;
(Continued)

(56) References Cited

U.S. PATENT DOCUMENTS 4,569,471 A     2/1986  Ingemansson et al.
5,670,756 A     9/1997  Ohtaka et al.
                (Continued)

FOREIGN PATENT DOCUMENTS

DE    3304809 A1    8/1984
EP    0128050 B1    8/1988
            (Continued)

OTHER PUBLICATIONS

Examination Report from the European Patent Office dated Jul. 11, 2022 in related EP application No. 22157776.0, including grounds for rejection, Search report, and examined claims 1-14.
(Continued)

*Primary Examiner* — Christopher J Besler
(74) *Attorney, Agent, or Firm* — J-TEK LAW PLLC; Jeffrey D. Tekanic; Scott T. Wakeman

(57) ABSTRACT

A method for manufacturing a vehicle muffler includes: forming a tubular body (6; 91, 92) from a nonwoven fabric (2; 2A, 2B) composed of inorganic fibers (11) each being in a filament form; inserting and installing the tubular body (6) as a sound-absorbing material into a space (S) between an inner pipe (72; 81) and an outer pipe (71; 821, 822) of an inner-outer double pipe constituting a vehicle muffler. The tubular body (6) may be obtained by applying a binder (3) to one surface (2a) of the nonwoven fabric (2), then rolling the nonwoven fabric (2) into a tubular shape with the surface (2a) having the binder (3) applied thereto facing inward, infiltrating additional binder (3) into an outer peripheral surface of the tubular-shaped nonwoven fabric (2), and then heating the tubular-shaped nonwoven fabric (2) to a predetermined temperature to harden the binder (3).

20 Claims, 9 Drawing Sheets

(51) Int. Cl.
  *B29D 23/00* (2006.01)
  *D04H 13/00* (2006.01)

(52) U.S. Cl.
  CPC .. *B29K 2995/0002* (2013.01); *D10B 2101/06* (2013.01); *D10B 2505/12* (2013.01); *F01N 2450/02* (2013.01); *F01N 2450/06* (2013.01)

(58) Field of Classification Search
  CPC ........ F01N 2450/06; B29K 2995/0002; D04H 3/002; D04H 3/004; D04H 3/105
  See application file for complete search history.

(56) References Cited

U.S. PATENT DOCUMENTS

| | | | |
|---|---|---|---|
| 5,718,045 | A | 2/1998 | Tsukahara et al. |
| 5,766,541 | A * | 6/1998 | Knutsson ............... F01N 1/24 425/80.1 |
| 5,981,046 | A | 11/1999 | Masui et al. |
| 6,138,791 | A | 10/2000 | Zanzie |
| 2001/0011780 | A1 | 8/2001 | Knutsson |
| 2002/0079161 | A1 | 6/2002 | Curtice et al. |
| 2009/0272600 | A1 | 11/2009 | Okabe et al. |
| 2010/0307863 | A1 | 12/2010 | Flier et al. |

FOREIGN PATENT DOCUMENTS

| | | | | |
|---|---|---|---|---|
| GB | 2065596 | A | * 7/1981 | ............ B60K 13/04 |
| JP | S4540609 | B | 12/1970 | |
| JP | S588216 | A | 1/1983 | |
| JP | S6023208 | U | 2/1985 | |
| JP | H04203308 | A | 7/1992 | |
| JP | H07293222 | A | 11/1995 | |
| JP | H0886211 | A | 4/1996 | |
| JP | H091714 | A | 1/1997 | |
| JP | 2000240426 | A | 9/2000 | |
| JP | 2002004832 | A | 1/2002 | |
| JP | 2020180604 | A | 11/2020 | |

OTHER PUBLICATIONS

Office Action from the Japanese Patent Office dispatched Mar. 29, 2022, in related Japanese application No. 2021035930, and machine translation thereof.

* cited by examiner

METHOD FOR MANUFACTURING A VEHICLE MUFFLER

CROSS-REFERENCE TO RELATED APPLICATION

The present application claims priority to Japanese patent application No. 2021-035930 filed on Mar. 8, 2021, the contents of which are hereby fully incorporated herein by reference.

BACKGROUND OF THE INVENTION

Technical Field

The present invention generally relates to a method for manufacturing a vehicle muffler, such as a method for manufacturing a vehicle muffler having a structure that includes (contains) a sound-absorbing material provided between inner and outer pipes of a double pipe muffler.

Related Art

U.S. Pat. No. 4,569,471 discloses a method for automatically installing (inserting) a sound-absorbing material in a vehicle muffler having a double pipe structure. In this known method, fiberglass wool serves as the sound-absorbing material and is blown into a space between inner and outer pipes constituting the inner-outer double pipe of the muffler by using a nozzle supplied with compressed air; at the same time, air inside the inner pipe, which has numerous sound-absorbing holes formed therein, is suctioned using a fan to facilitate the blowing of the glass fiber into the muffler.

However, the above-described known method requires large-scale equipment that includes the nozzle, the fan for blowing of the fiber and piping for the nozzle and the fan. Also, the known method requires a relatively long time from start to completion of the blowing of the fiber, which disadvantageously increases the takt time of the manufacturing line, i.e. the average time interval between the start of production of one muffler and the start of production of the next muffler when the mufflers are being produced sequentially.

SUMMARY

It is therefore one, non-limiting object of the present teachings to disclose techniques for improving a method for manufacturing a vehicle muffler that can simply and quickly install (insert) a sound-absorbing material between inner and outer pipes of a double pipe of a vehicle muffler.

In a first aspect of the present teachings, an exemplary, non-limiting method includes: forming a tubular body (6) from (using) a nonwoven fabric (2) composed of inorganic fibers (11) each being in a filament (elongated fiber) form; and inserting and installing the tubular body (6) as a sound-absorbing material into a space (S) between an inner pipe (72) and an outer pipe (71) of an inner-outer double pipe constituting a vehicle muffler.

In the first aspect, the tubular body made of the nonwoven fabric can be inserted and installed as the sound-absorbing material between the inner pipe and the outer pipe with a single motion. Thus, compared to the above-described known method that blows sound-absorbing fibers into a space between the inner pipe and the outer pipe, large-scale equipment is not required, and the takt time of the manufacturing line can be significantly reduced. In particular, since inorganic fibers are used in a filament form, the resulting vehicle muffler is capable of enduring high back pressure of the exhaust gas.

In a second aspect of the present teachings, the tubular body (6) may be obtained by: applying a binder (3) to one surface (2a) of the nonwoven fabric (2); then rolling up the nonwoven fabric (2) into a tubular shape such that the surface (2a) having the binder (3) applied thereto faces radially inward (i.e. is on the radially inward side); infiltrating (impregnating) additional binder (3) into an outer peripheral (e.g., circumferential) surface of the nonwoven fabric (2) that has been rolled up into the tubular shape; and heating the nonwoven fabric (2) infiltrated with additional binder (3) to a predetermined temperature in order to harden the binder (3).

According to the second aspect, the tubular body reliably maintains its shape. Thus, it is easy to handle the tubular body and insert it into the double pipe of a muffler.

A third aspect of the present teachings includes: forming a pair of half bodies (91, 92) using a nonwoven fabric (2A, 2B) composed of inorganic fibers (11) each being in a filament (elongated fiber) form; attaching the half bodies (91, 92) in an abutting state to an outer periphery of an inner pipe (81) of an inner-outer double pipe constituting a vehicle muffler so as to cover the inner pipe (81) and obtain a tubular body (9) serving as a sound-absorbing material; and covering the tubular body (9) with an outer pipe (or shell) (82).

In the third aspect, the pair of half bodies composed of the nonwoven fabric are attached in an abutting state to the outer periphery of the inner pipe so as to cover the inner pipe and obtain the tubular body serving as the sound-absorbing material, and the tubular body is covered by the outer pipe (or shell). Thus, it is possible to adjust or adapt the form of the tubular body to fit between an inner pipe and an outer pipe that do not have parallel tubular shapes, i.e. the tubular body of sound-absorbing material may have an irregular tubular shape. Further, compared to the above-described known method that blows sound-absorbing fibers into a space between the inner pipe and the outer pipe, large-scale equipment is not required, and the takt time of the manufacturing line can be significantly reduced. In particular, since the inorganic fiber is used in the filament (elongated fiber) form, the resulting vehicle muffler is capable of enduring high back pressure of the exhaust gas.

In a fourth aspect of the present teachings, each of the half bodies (91, 92) is obtained by: horizontally installing (placing) one nonwoven fabric (2A), which has a binder (2) applied to one surface thereof, in a recessed shape (recess) defined by an inner surface (periphery) of a container-shaped jig (101) that is open in the upward direction; rolling up a plurality of other nonwoven fabrics (2B); inserting the other nonwoven fabrics (2B) into a space (recessed space) formed by the one nonwoven fabric (2A) disposed in the container-shaped jig (101); thereafter, wrapping (surrounding) the other nonwoven fabrics (2B) with ends of the one nonwoven fabric (2A); and then closing the container-shaped jig (101) and heating the container-shaped jig (101) to a predetermined temperature to harden the binder.

According to the fourth aspect, it is possible to efficiently manufacture porous half bodies constituting the tubular body serving as the sound-absorbing material.

In a fifth aspect, the nonwoven fabric (2) is obtained by: opening (loosening, spreading apart) strands (1) of the inorganic fibers (11); loosely arranging the opened strands in a longitudinal and lateral array, i.e. in a grid-like form; and then subjecting the arrayed strands to needle processing (needle punching) in order to interconnect the inorganic fibers.

According to the fifth aspect, it is possible to increase the sound absorption performance in an efficient manner due to the small spaces formed by (between) the opened strands. In addition, since the strands are loosely arrayed longitudinally and laterally and subjected to needle processing (needle punching), the strength of the resulting tubular body can be sufficiently maintained after the tubular body has been hardened and removed from the container-shaped jig.

In a sixth aspect of the present teachings, basalt fiber (11) or glass fiber is used as the inorganic fiber.

According to the sixth aspect, sufficient resistance to high-temperature exhaust gas and exhaust gas components can be exhibited.

The above numerals in parentheses indicate, for reference and explanatory purposes only, representative, non-limiting correspondence relationships with specific structures described in the below-described embodiment of the present teachings. Such reference numbers are not intended to restrict or limit the scope of the present teachings in any manner.

As described above, according to the vehicle muffler manufacturing method of the present teachings, it is possible to easily and quickly install (insert) the sound-absorbing material between the pipes of an inner-outer double pipe of a vehicle muffler.

DETAILED DESCRIPTION OF THE PREFERRED EMBODIMENTS

It is noted that the representative exemplary embodiments described below are merely examples of the present teachings, and various design improvements, which may be made by those skilled in the art without departing from the gist of the present invention, are also included in the scope of the present invention.

First Embodiment

Figure 1:
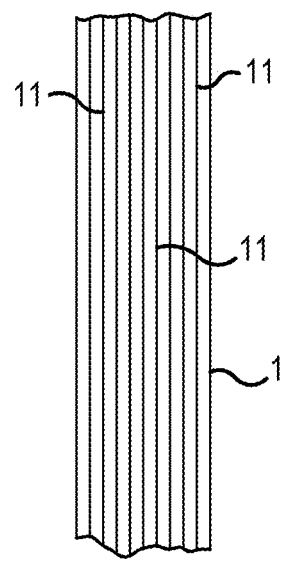
FIG. 1 is an enlarged side view of one strand of inorganic fibers according to a first embodiment of the present teachings.
Figure 2:
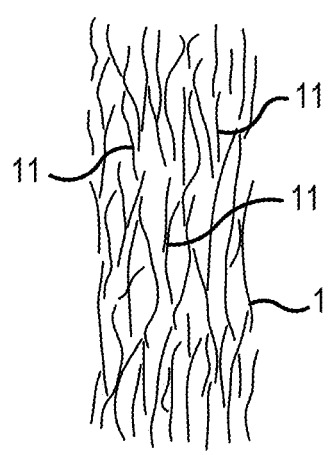
FIG. 2 is an enlarged side view of one opened (loosened) strand.
Figure 3:
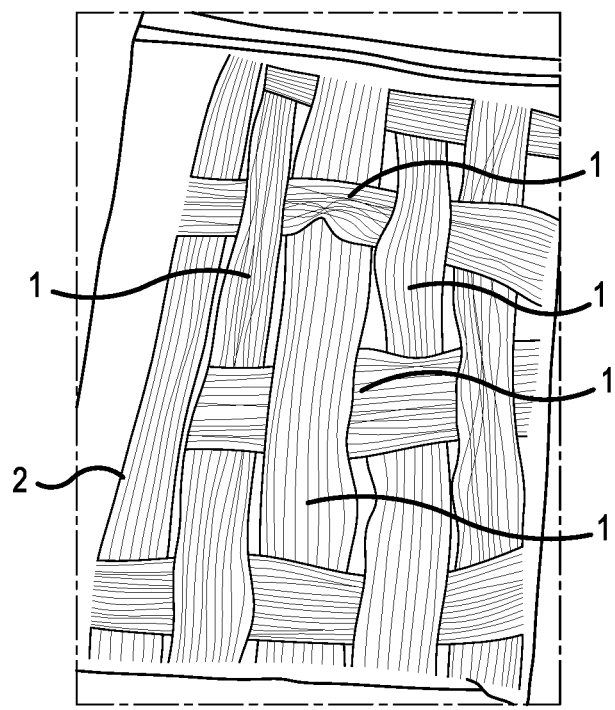
FIG. 3 is a plan view of a nonwoven fabric for use in forming a sound-absorbing material for a vehicle muffler.

In a manufacturing method of a first embodiment of the present teachings, for example, basalt fibers 11 (see FIG. 1), which are in the form of filaments of 9 µmφ to 24 µmφ and having lengths of at least 5 cm, more preferably at least 10 cm, more preferably at least 15 cm, are used as the inorganic fiber. One strand 1 is formed from a bundle of, for example, 1000 to 4000 basalt fibers (filaments) 11, and is opened (loosened, spread apart) using, for example, compressed air (see FIG. 2). Then, a plurality of opened (loosened) strands 1 are loosely arranged or arrayed in a grid-like (mesh-like, net-like) form, i.e. a first plurality of opened strands 1 extend in a first (e.g., longitudinal) direction and a second plurality of opened strands 1 extend in a second (e.g., lateral or transverse) direction that is perpendicular, or substantially perpendicular, to the first direction. The first direction intersects the second direction and the first and second directions may form an angle of, e.g., 70-110°, e.g., 80-100°, e.g., 85-95°. The first plurality of strands may be simply laid on top of, or below, the second plurality of strands, or the second set of strands may be interlaced with the first set of strands, e.g., as shown in FIG. 3. At this stage of the manufacturing process, the grid-like shape is not yet fixed, because the strands 1 merely lay on each other and thus are movable relative to each other. Therefore, in the next manufacturing step, the strands 1 in the grid-like form are subjected to needle processing (needle punching) to interconnect (intermingle) the strands 1 (i.e. the fibers 11) in a third direction that is perpendicular or substantially perpendicular to the first and second directions to obtain a nonwoven fabric 2 having a fixed rectangular mat shape as shown in FIG. 3.

Figure 4:
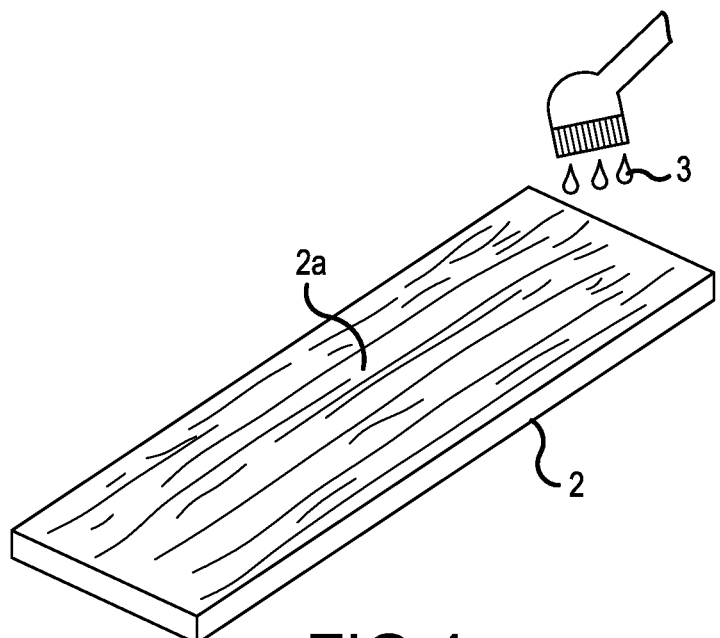
FIG. 4 is a perspective view of the nonwoven fabric having a binder being applied thereto.
Figure 5:
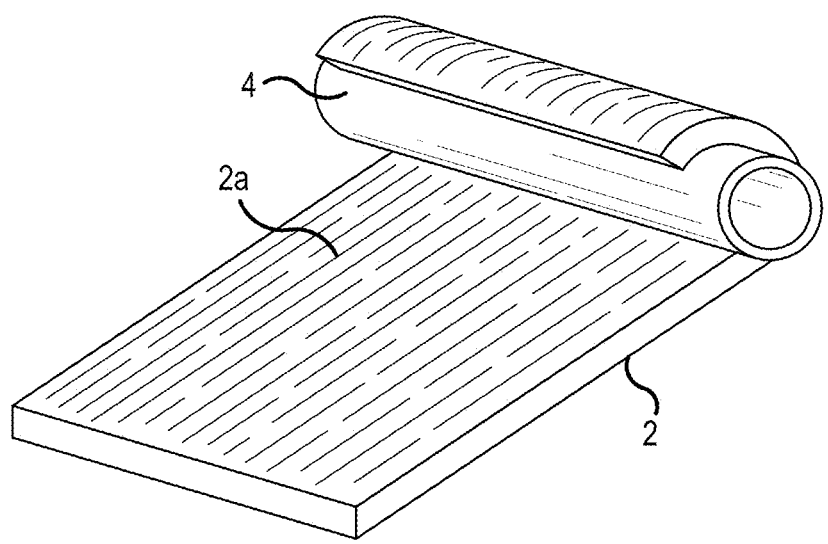
FIG. 5 is a perspective view of the nonwoven fabric wrapped (rolled) around a metal core (cylinder)
Figure 6:
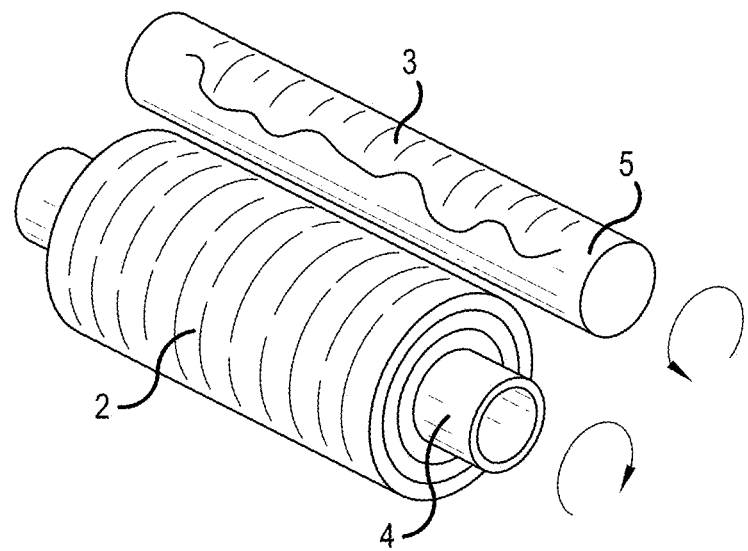
FIG. 6 is a schematic perspective view illustrating a state in which a rotating roller is brought into contact with an outer peripheral surface of the nonwoven fabric wrapped around the core metal in order to apply additional binder to the outer peripheral surface of the nonwoven fabric.

As shown in FIG. 4, an inorganic binder 3, such as bentonite, is then applied to one surface 2a of the nonwoven fabric 2 obtained in this manner. Thereafter, as illustrated in FIG. 5, the nonwoven fabric 2 is wrapped (rolled) around a metal core (cylinder) 4 such that the surface 2a, which has the binder 3 applied thereon, is located on the inner peripheral side, i.e. radially inward. In this rolled or wrapped state, the binder 3 on the inner peripheral surface 2a of the nonwoven fabric 2 may be hardened. Then, as illustrated in FIG. 6, a rotating roller 5, which is supplied with the same binder 3 described above, is brought into contact with the outer peripheral surface of the nonwoven fabric 2 to cause additional binder 3 to infiltrate (impregnate) into the entire outer peripheral (e.g., circumferential) surface of the nonwoven fabric 2 wrapped around the metal core 4 and thus into the interior of the nonwoven fabric 2.

Figure 7:
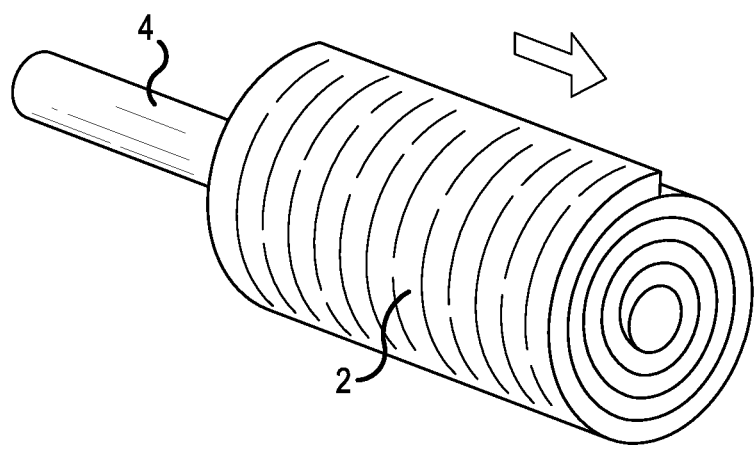
FIG. 7 is a schematic perspective view illustrating a state in which the tubular-shaped nonwoven fabric is being removed from the metal core.
Figure 8:
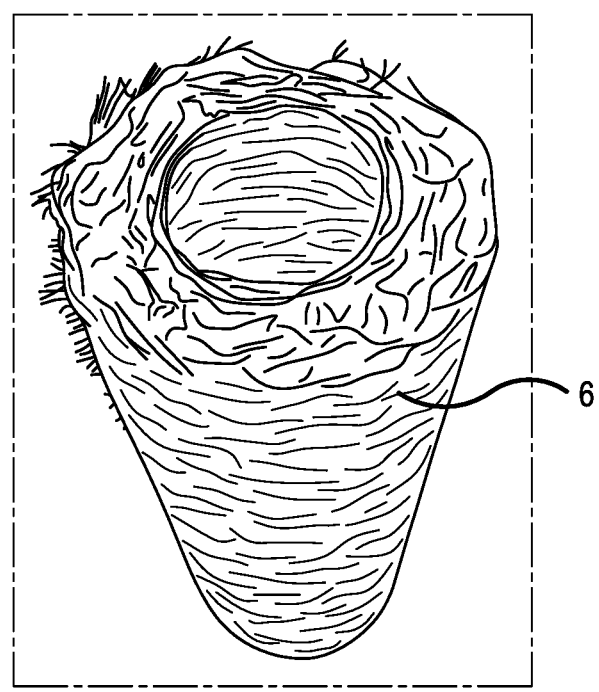
FIG. 8 is a photograph of an overall perspective view of a tubular body as viewed in an end-face direction thereof.

Then, the nonwoven fabric 2, which has been wrapped around the metal core 4 and infiltrated with the additional binder 3, is placed inside a heating furnace that has been heated to, for example, 240° C. for 1 to 2 hours to harden (e.g., solidify) the binder 3, such that the entire structure made of the nonwoven fabric 2 and the binder 3 becomes rigid, i.e. the tubular form will be maintained after removing the nonwoven fabric 2 from the metal core 4. Then, the nonwoven fabric 2 is removed from the metal core 4 (FIG. 7) to obtain a tubular body 6 for sound absorption as shown in FIG. 8. In this state, the outer diameter of the tubular body 6 is slightly smaller than the inner diameter of an outer pipe 71 (FIG. 9) of an inner-outer double pipe (further described below), and the inner diameter of the tubular body 6 is slightly larger than the outer diameter of an inner pipe 72 of the double pipe. Here, it is noted that, although FIG. 8 shows a perspective view of the tubular body 6 that appears as if the tubular body 6 is a conical tube, in fact, the tubular body 6 is actually a parallel cylindrical body, i.e. a hollow regular cylinder. The tubular body 6 does not, however, necessarily have to be a cylindrical body and may be in the form of, for example, an elliptical tube or a rectangular tube in other applications of the present teachings.

Figure 9:
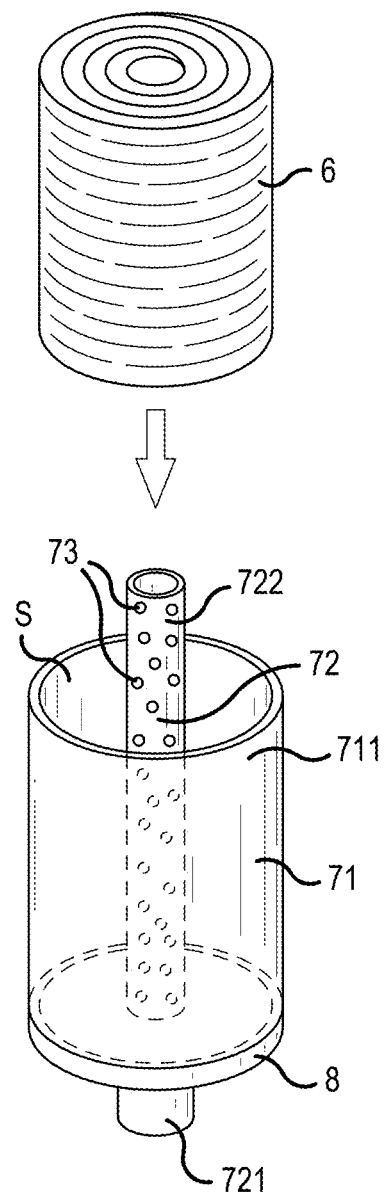
FIG. 9 is a perspective view illustrating a state in which the tubular body is being inserted into a double pipe to form a vehicle muffler.

Then, the resulting rigid tubular body 6 is inserted between the pipes of the double pipe constituting the vehicle muffler, as illustrated in FIG. 9. The double pipe includes the outer pipe 71 which has a larger diameter and is held in a vertical position by a jig or other type of holding means (not illustrated), and the inner pipe 72 which has a smaller diameter and has a plurality of sound-absorbing holes 73 formed therein. The inner pipe 72 is preferably located at (in) the center of the outer pipe 71, but it may be offset from the center in other applications of the present teachings. An end plate 8 is welded onto one end of the outer pipe 71 so as to close the opening at one (lower) end. One end 721 (the lower end in FIG. 9) of the inner pipe 72 penetrates through the center of the end plate 8 so that the inner pipe 72 is supported inside the outer pipe 71 by the end plate 8.

As this time, the other end 711 (the upper end in FIG. 9) of the outer pipe 71 is still open. Therefore, as indicated by the arrow in FIG. 9, the tubular body 6 is inserted and installed, from above, into a space S between the inner pipe 72 located at the center of the opening and the outer pipe 71 so as to serve as a sound-absorbing material for the vehicle muffler. After the tubular body 6 is installed (inserted), another end plate (not illustrated) is welded onto the other (upper) opening of the outer pipe 71 to close the opening at the other end 711; in this state, the other end 722 of the inner pipe 72 penetrates through the center of the other end plate to obtain the vehicle muffler.

As described above, according to the first embodiment of a manufacturing method according to the present teachings, the tubular body for sound absorption can be inserted and installed between the inner pipe and the outer pipe with a single motion. Thus, compared to the above-described known method that blows sound-absorbing fibers into a container, large-scale equipment is not required, and the takt time of the manufacturing line can be significantly reduced.

Second Embodiment

In the first embodiment, a first representative method for manufacturing a vehicle muffler, which includes an outer pipe that is a simple parallel tubular body (hollow regular cylinder), was described. However, in the present second embodiment, another representative example of a method for manufacturing a vehicle muffler will now be described, in which the outer pipe is an irregular-shaped tubular body.

Figure 10:
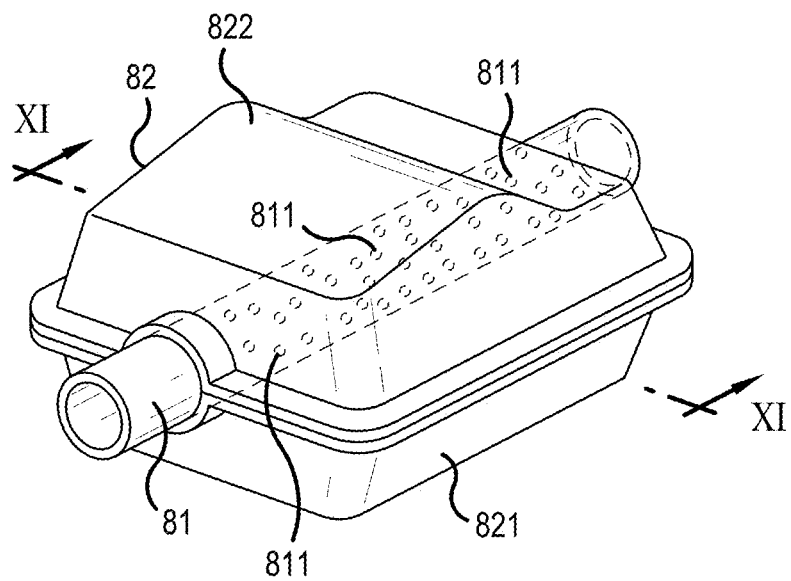
FIG. 10 is an overall perspective view of a vehicle muffler according to a second embodiment of the present teachings.
Figure 11:
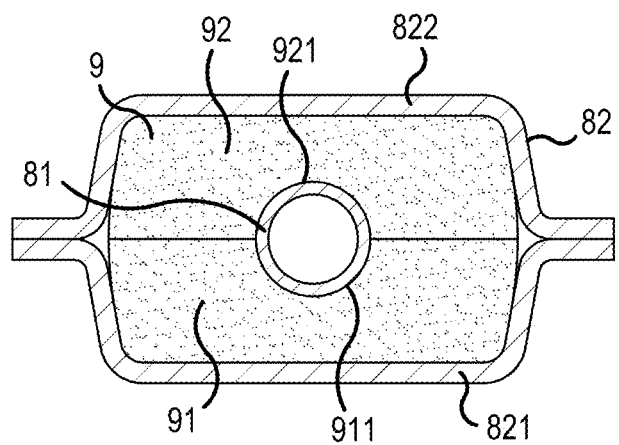
FIG. 11 is a cross-sectional view of the vehicle muffler taken along line XI-XI of FIG. 10.

FIG. 10 is a perspective view of the vehicle muffler of the second embodiment. FIG. 11 is a cross-sectional view through the vehicle muffler of FIG. 10. As illustrated in FIGS. 10 and 11, an inner pipe 81 of the vehicle muffler has a plurality of sound-absorbing holes 811 formed along the outer periphery thereof and has a parallel cylindrical shape, i.e. it has a hollow regular cylinder shape. On the other hand, an outer pipe (or outer shell) 82 of the vehicle muffler is an irregular-shaped tubular body having a box shape; the inner pipe 81 penetrates through the outer pipe 82. The outer pipe 82 includes first and second half tubular bodies 821 and 822, each of which is formed by bending (e.g., press forming) into a predetermined shape, specifically, into an open container shape. The half tubular bodies 821 and 822 abut against each other with the inner pipe 81 interposed between open edges of the first and second half tubular bodies 821 and 822. Further, a tubular body 9 (FIG. 11, described below) serving as a sound-absorbing material is installed inside a space between the inner pipe 81 and the outer pipe 82 constituting an inner-outer double pipe. It is note that the inner pipe 81 does not necessarily have to have a parallel cylindrical shape, i.e. a hollow regular cylinder shape, and other shapes of tubes may be used for the inner pipe 81 in other applications of the present teachings.

Figure 12:
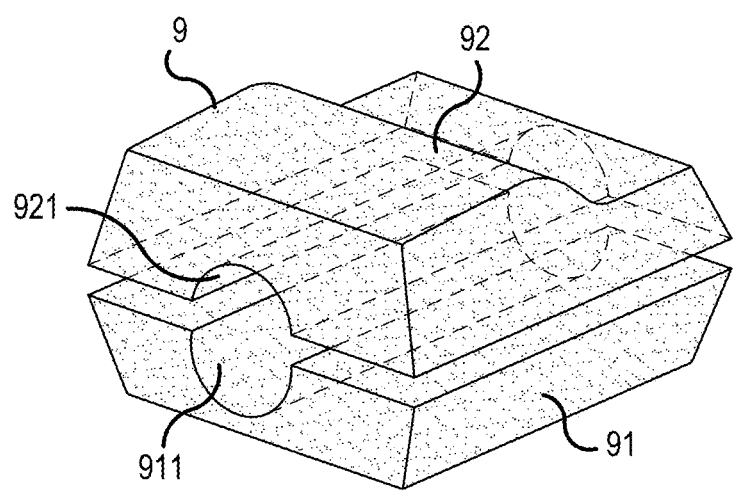
FIG. 12 is an overall exploded perspective view of a tubular body according to the second embodiment.

The tubular body 9 includes a first half body 91 installed (disposed) inside the first half tubular body 821 of the outer pipe 82 and a second half body 92 installed (disposed) inside the second half tubular body 822 of the outer pipe 82. The first half body 91 and the second half body 92 abut against each other to constitute the tubular body 9 having an overall tubular shape. As illustrated in FIG. 12, a first recessed part (first recess) 911 having a substantially semicircular cross section along the outer periphery of the inner pipe 81 is formed along the center of an abutment surface of the first half body 91. Similarly, a second recessed part (second recess) 921 having a substantially semicircular cross section along the outer periphery of the inner pipe 81 is formed along the center of an abutment surface of the second half body 92. Also, an outer peripheral surface of the first half body 91 is formed in a shape extending along (complementary to) an inner peripheral surface of the first half tubular body 821 of the outer pipe 82, and an outer peripheral surface of the second half body 92 is formed in a shape extending along (complementary to) an inner peripheral surface of the second half tubular body 822 of the outer pipe 82.

The tubular body 9 serves as the sound-absorbing material and is attached to or surrounds the outer periphery of the inner pipe 81 so as to cover (surround) the inner pipe 81 by abutting the first and second half bodies 91 and 92 against each other with the inner pipe 81 located in the first and second recessed parts 911 and 921 of the first and second half bodies 91 and 92 (see FIG. 11). Then, the tubular body 9, which has the inner pipe 81 coupled thereto, is installed inside the first half tubular body 821. Then, the second half tubular body 822 is placed on the tubular body 9 from above so as to abut against the open edge of the half tubular body 821, thereby constituting (forming) the outer pipe 82 and completing the vehicle muffler shown in FIGS. 10 and 11.

Figure 13:
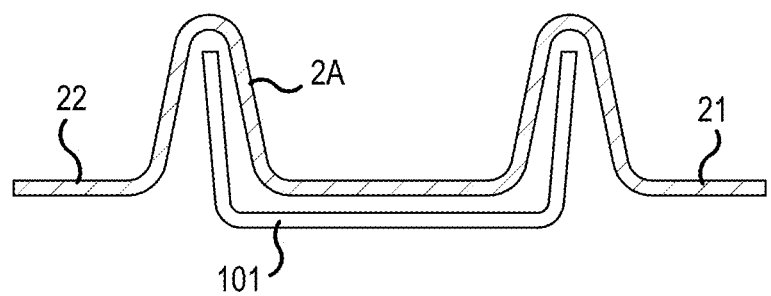
FIG. 13 is a cross-sectional view of one step in a process of manufacturing a half body of a tubular body.
Figure 14:
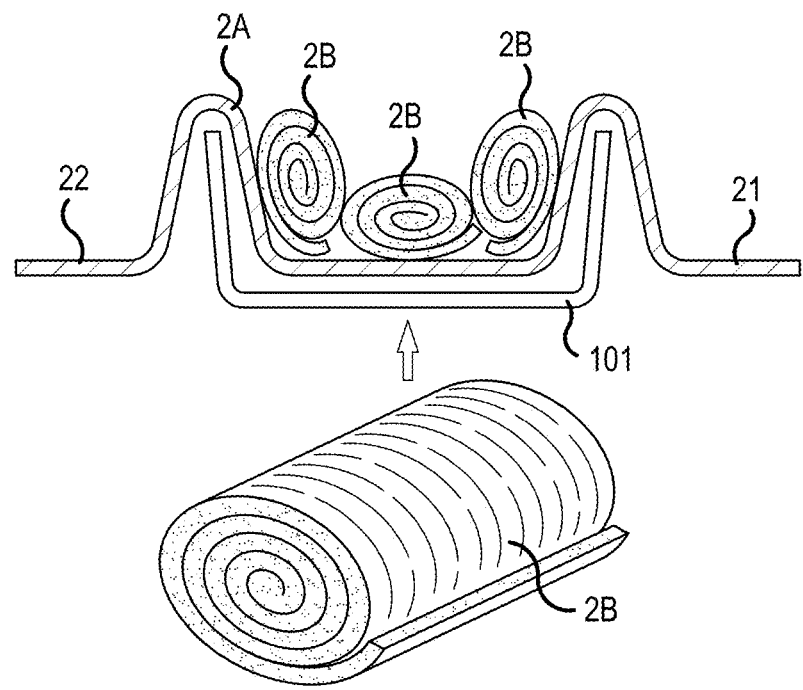
FIG. 14 is a cross-sectional view of a subsequent step in the process of manufacturing the half body of the tubular body and a perspective view of a nonwoven fabric rolled up in a tubular shape.

The above-described first half body 91 of the tubular body 9 may be manufactured, e.g., in the following manner. Note that the method for manufacturing the second half body 92 may be the same as or different from the method for manufacturing the first half body 91. A binder is applied to one surface of a nonwoven fabric 2A that may be the same as or similar to the nonwoven fabric 2 manufactured by the method described in the first embodiment and shown in FIG. 3. As illustrated in FIG. 13, the nonwoven fabric 2A is then disposed substantially horizontally along (on) an inner surface of a container-shaped jig 101, which is open in the upward direction and has the same cross section as the first half tubular body 821 of the outer pipe 82 (FIG. 11) so as to hang down in a recessed shape. The surface of the nonwoven fabric 2A having the binder applied thereto faces upward. Then, as illustrated in FIG. 14, multiple other nonwoven fabrics 2B, which each may be formed from the same nonwoven fabric 2A or a nonwoven fabric similar thereto, are respectively rolled up into a tubular shape and inserted into the recessed space formed by the nonwoven fabric 2A.

Figure 15:
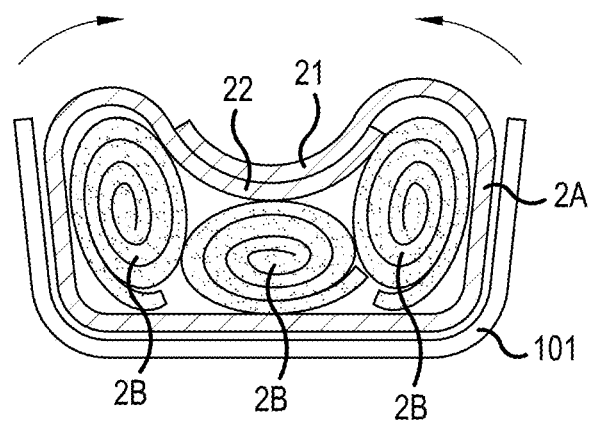
FIG. 15 is a cross-sectional view of a subsequent step in the process of manufacturing the half body of the tubular body.
Figure 16:
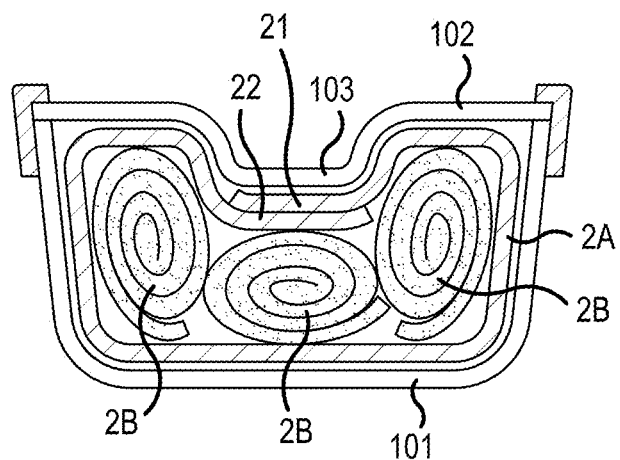
FIG. 16 is a cross-sectional view of a subsequent step in the process of manufacturing the half body of the tubular body.
Figure 17:
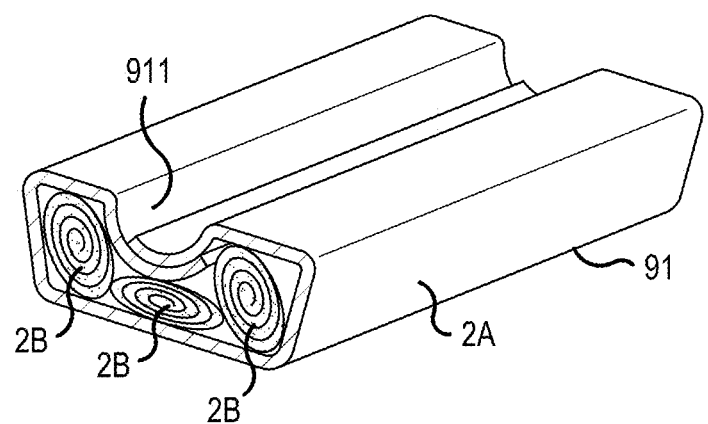
FIG. 17 is an overall perspective view of the manufactured half body of the tubular body according to the second embodiment.

Then, as illustrated in FIG. 15, both side edges 21 and 22 of the nonwoven fabric 2A are folded inward so as to wrap (cover, surround) the plurality of rolled-up nonwoven fabrics 2B (FIG. 15), and a lid-shaped jig 102 is placed on top of the side edges 21, 22 to close the container-shaped jig 101 and cover the nonwoven fabric 2A (FIG. 16). Here, it is noted that the lid-shaped jig 102 includes a projection (protrusion, ridge) 103 formed by bending the center thereof and projecting downward in a semicircular shape. The projection 103 pushes the folded side edges 21 and 22 of the nonwoven fabric 2A downward. At the same time, the tubular nonwoven fabrics 2B disposed inside the nonwoven fabric 2A become slightly compressed. In this state, the container-shaped jig 101, which has been closed by the lid-shaped jig 102, is placed into a heating furnace, heated at, for example, 240° C. for 1 to 2 hours to harden (solidify) the binder applied to the nonwoven fabric 2A, and then taken out from the heating furnace to obtain the first half body 91 described above (FIG. 17). As was noted above, the second half body 92 may be formed in substantially the same manner.

In each of the embodiments, the fibers 11 preferably extend the entire length of the longitudinal and transverse (lateral) direction of the nonwoven fabric 2 without breaks.

Other Embodiments

Various modifications may be made to the above-described first and second embodiments in order to obtain additional embodiments of the present teachings.

For example, glass fiber (e.g., fiberglass wool) can be used as the inorganic fiber instead of the basalt fiber described above. In fact, any sound-absorbing fiber capable of withstanding the high temperatures inside a vehicle muffler optionally may be utilized with the present teachings.

Further, it is not essential to use a nonwoven fabric (2, 2A) formed by arranging (arraying) strands longitudinally and laterally. For example, instead a nonwoven fabric formed by aligning and stacking strands in the same direction or a nonwoven fabric formed by alternately stacking, longitudinally and laterally, strands aligned in the same direction or the like may be advantageously used in other embodiments of the present teachings.

What is claimed is:

1. A method for manufacturing a vehicle muffler comprising:
   (a) placing a first nonwoven fabric having a binder applied to one surface thereof on an inner surface of an upwardly-open container-shaped jig, so that the first nonwoven fabric forms a recessed shape;
   (b) rolling up a plurality of second nonwoven fabrics;
   (c) inserting the second, rolled-up nonwoven fabrics into the recessed space formed by the first nonwoven fabric;
   (d) wrapping ends of the first nonwoven fabric around the plurality of second, rolled-up nonwoven fabrics disposed in the recessed space;
   (e) closing the container-shaped jig and heating the container-shaped jig to a predetermined temperature to harden the binder and form a first half body;
   (f) repeating steps (a)-(e) to form a second half body;
   (g) attaching the first and second half bodies in an abutting state to an outer periphery of an inner pipe so as to cover or surround a peripheral surface of the inner pipe, to obtain a tubular body serving as a sound-absorbing material; and
   (h) surrounding the tubular body with an outer pipe to constitute the vehicle muffler;
   wherein each of the first nonwoven fabric and the second nonwoven fabrics are composed of inorganic fibers each being in a filament form.

2. The method according to claim 1, wherein at least one of the first or second nonwoven fabric is formed by:
   loosening strands of the inorganic fibers;
   loosely arranging the loosened strands longitudinally and laterally in a grid shape or mesh shape; and
   subjecting the arrayed strands to needle punching to interconnect the inorganic fibers.

3. The method according to claim 2, wherein the inorganic fibers are basalt fibers or glass fibers.

4. A method comprising:
   (a) applying a binder to one surface of a first nonwoven fabric composed of first inorganic filaments;
   (b) placing the first nonwoven fabric on an inner surface of an upwardly-open container-shaped jig such that the one surface having the binder applied thereto faces upward and the first nonwoven fabric forms a recessed shape;
   (c) rolling up a plurality of second nonwoven fabrics composed of second inorganic filaments;
   (d) inserting the second, rolled-up nonwoven fabrics into the recessed space formed by the first nonwoven fabric;
   (e) wrapping ends of the first nonwoven fabric around the second, rolled-up nonwoven fabrics disposed in the recessed shape formed by the first nonwoven fabric;
   (f) closing the container-shaped jig and heating the container-shaped jig to a predetermined temperature to harden the binder, thereby forming a first half body;
   (g) repeating steps (a)-(f) to form a second half body;
   (h) attaching the first and second half bodies in an abutting state to an outer periphery of an inner pipe so as to cover or surround a peripheral surface of the inner pipe, thereby obtaining a tubular body serving as a sound-absorbing material; and
   (i) surrounding the tubular body with an outer pipe to constitute a vehicle muffler.

5. The method according to claim 4, wherein the first and second nonwoven fabrics are each formed by:
   loosening strands of the first and second inorganic filaments, respectively;
   loosely arranging the loosened strands longitudinally and laterally in a grid shape or mesh shape; and
   subjecting the arrayed strands to needle punching to interconnect the first inorganic filaments or second inorganic filaments, respectively.

6. The method according to claim 5, wherein the first and second inorganic filaments are basalt filaments or glass filaments.

7. The method according to claim 1, wherein the inorganic fibers have a length of at least 10 centimeters.

8. The method according to claim 2, wherein the step of loosely arranging the loosened strands longitudinally and laterally in a grid shape or mesh shape comprises:
    disposing a first plurality of the loosened strands substantially parallel in a first direction; and
    disposing a second plurality of the loosened strands on top of the first plurality of loosened strands substantially parallel in a second direction, the second direction being at least substantially perpendicular to the first direction.

9. The method according to claim 8, wherein the second plurality of loosened strands are interlaced with the first plurality of loosened strands.

10. The method according to claim 9, wherein the inorganic fibers each have a length of at least 15 centimeters.

11. The method according to claim 10, wherein the inorganic fibers each have a diameter of 9-24 μm.

12. The method according to claim 11, wherein each of the strands of the inorganic fibers is composed of 1000-4000 filaments.

13. The method according to claim 12, wherein the inorganic fibers are basalt fibers or glass fibers.

14. The method according to claim 12, wherein the inorganic fibers are basalt fibers.

15. The method according to claim 14, wherein the binder is bentonite.

16. The method according to claim 15, wherein the predetermined temperature is 240° C.

17. A method for manufacturing a vehicle muffler comprising:
    (a) applying a binder to a first surface of a first nonwoven fabric composed of inorganic fibers each having a length of at least 5 cm,
    (b) placing a second surface of the first nonwoven fabric on an inner surface of an upwardly-open container-shaped jig so that the first nonwoven fabric is deformed to define a recess;
    (c) rolling up a plurality of second nonwoven fabrics each composed of inorganic fibers each having a length of at least 5 cm, thereby forming a plurality of second, rolled-up nonwoven fabrics;
    (d) placing the plurality of second, rolled-up nonwoven fabrics into the recess defined in the first nonwoven fabric and proximal to the binder on the first surface of the first nonwoven fabric;
    (e) wrapping ends of the first nonwoven fabric around the plurality of second, rolled-up nonwoven fabrics disposed in the recess;
    (f) closing the container-shaped jig and heating the container-shaped jig to harden the binder, thereby forming a first half body;
    (g) performing steps (a)-(f) to form a second half body;
    (h) attaching the first and second half bodies to an outer periphery of an inner pipe so that portions of the first and second half bodies abut each other and the first and second half bodies cover or surround a peripheral surface of the inner pipe, thereby forming a sound-absorbing tubular body; and
    (i) disposing the sound-absorbing tubular body in an interior of an outer pipe, thereby forming the vehicle muffler.

18. The method according to claim 17, wherein the first and second nonwoven fabrics are each formed by:
    loosening strands of the inorganic fibers;
    loosely arranging the loosened strands longitudinally and laterally in a grid shape or mesh shape; and
    subjecting the arrayed strands to needle punching to intermingle the inorganic fibers.

19. The method according to claim 17, wherein the inorganic fibers are basalt fibers.

20. The method according to claim 4, wherein the first and second inorganic filaments:
    each have a length of at least 10 centimeters; and
    are both composed of basalt or are both composed of glass.

* * * * *